(12) United States Patent
Bennett et al.

(10) Patent No.: US 10,156,293 B1
(45) Date of Patent: Dec. 18, 2018

(54) FLUID PUMP PRESSURE RELIEF VALVE

(71) Applicant: GM GLOBAL TECHNOLOGY OPERATIONS LLC, Detroit, MI (US)

(72) Inventors: Andy Bennett, Rochester Hills, MI (US); Joel H. Pike, Haslett, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/653,044

(22) Filed: Jul. 18, 2017

(51) Int. Cl.
| F16K 15/00 | (2006.01) |
| F01M 1/02 | (2006.01) |
| F16K 15/02 | (2006.01) |
| F01M 1/16 | (2006.01) |
| F16K 31/122 | (2006.01) |

(52) U.S. Cl.
CPC ............. *F16K 15/026* (2013.01); *F01M 1/02* (2013.01); *F01M 1/16* (2013.01); *F16K 31/1221* (2013.01); F01M 2001/0284 (2013.01)

(58) Field of Classification Search
CPC .... F16K 15/026; F16K 15/028; F16K 15/025; F16K 15/023; F16K 15/021; F16K 15/04; F16K 15/044; F16K 17/003; F16K 31/1221; F01M 1/02
See application file for complete search history.

(56) References Cited

U.S. PATENT DOCUMENTS

| 2,714,392 | A | | 4/1955 | Mercier | |
| 5,092,361 | A | * | 3/1992 | Masuyama | ........... F16K 15/026 |
| | | | | | 137/543.21 |
| 7,028,708 | B1 | | 4/2006 | Langenfeld et al. | |
| 2001/0022195 | A1 | | 9/2001 | Kazaoka | |
| 2006/0021661 | A1 | * | 2/2006 | Koch | ..................... F16K 15/026 |
| | | | | | 137/543.19 |
| 2010/0294972 | A1 | * | 11/2010 | Park | ....................... F16K 15/026 |
| | | | | | 251/337 |
| 2012/0103447 | A1 | | 5/2012 | Min et al. | |
| 2014/0311596 | A1 | * | 10/2014 | Kim | ........................ F04B 25/04 |
| | | | | | 137/528 |

* cited by examiner

*Primary Examiner* — Jacob Amick
(74) *Attorney, Agent, or Firm* — Quinn IP Law (57) ABSTRACT

In one or more embodiments, a pressure relief valve for a fluid pump has a valve head that has a recessed outlet-side surface that confronts a support end of a spring such that the valve head extends past the support end of the spring toward a pump outlet. The spring is biased to urge the valve head against a valve seat to a seated position. The spring is also configured to be compressed when fluid pressure at an inlet to the relief valve exceeds fluid pressure at the outlet by at least a predetermined amount such that the valve head is pushed away from the valve seat to an unseated position. A pressure relief valve may have multiple outlets at least some of which have unequal flow areas such that fluid pressure distribution across the flow area of the pressure relief valve cavity is nonsymmetrical.

11 Claims, 12 Drawing Sheets

FLUID PUMP PRESSURE RELIEF VALVE

INTRODUCTION

Fluid pumps pressurize fluid to cause the fluid to flow within a hydraulic circuit. For example, vehicles often include a fluid pump to pressurize an engine cooling circuit, and a transmission pump to pressurize a transmission cooling circuit. Many other non-vehicle applications also utilize fluid pumps. Some fluid pumps are equipped with pressure relief valves to prevent over-pressurization of the circuit.

SUMMARY

Within the scope of the present disclosure, a pressure relief valve for a fluid pump is provided that may reduce chatter and increase flow capacity through the valve, while also ensuring cost effectiveness, robustness and durability of the pump. The fluid pump may have many applications, including but not limited to vehicle engine and transmission applications.

In one or more embodiments, the pressure relief valve comprises a housing assembly that defines a cavity, an inlet to the cavity, a valve seat at the inlet, and at least one outlet from the cavity. A spring is disposed in the cavity. A valve head that has an inlet-side surface is configured to seat against the valve seat to close the inlet. The valve head has a recessed outlet-side surface that confronts a support end of the spring such that the valve head extends past the support end of the spring toward the outlet. The spring is biased to urge the valve head against the valve seat to a seated position. The spring is also configured to be compressed when fluid pressure at the inlet exceeds fluid pressure at the outlet by at least a predetermined amount such that the valve head is pushed away from the valve seat to an unseated position.

The recessed outlet-side surface reduces the weight of the valve head and enables the valve head to be formed from a sheet of generally uniform thickness, such as a steel sheet. A sheet may absorb energy to perform a damping function when the valve head is seated by elastic deformation more readily than a thicker valve head, such as a spherical ball head. This may increase valve life. Additionally, due at least to the recessed outlet-side surface that allows the valve head to extend past the support end of the spring toward the outlet, a center of gravity of the valve head is behind the force applied by the spring so that the valve head is effectively pulled against the valve seat by the spring (rather than pushed), contributing to the stability of the valve as the valve head is able to center itself in the inlet against the valve seat, including in embodiments in which the valve seat is conical. The valve has a desirable amount of blowdown, which is the ratio of the difference between the pressure at which the valve opens (i.e., the valve head unseats) and the pressure at which it reseats to the pressure at which the valve opens. A relatively thin, disk-like valve shape as with a uniform thickness sheet as shown may provide a significant damping function as the valve moves from the seated position to the unseated position.

In one or more embodiments of the pressure relief valve, the valve head has a generally uniform thickness between the inlet-side surface and the outlet-side surface. In one or more embodiments of the pressure relief valve, a contact surface of the valve head with the valve seat is annular. For example, the valve seat at the inlet may be frustoconical.

The inlet-side surface may have a variety of shapes. In one or more embodiments of the pressure relief valve, a portion of the inlet-side surface exposed to fluid pressure at the inlet when the valve head is in the seated position may be flat. Alternatively, the portion of the inlet-side surface exposed to fluid pressure at the inlet when the valve head is in the seated position may have a recessed center. In another alternative, the portion of the inlet-side surface exposed to fluid pressure at the inlet when the valve head is in the seated position may have a protruding center.

In one or more embodiments of the pressure relief valve, the spring is integrally connected to the valve head. The recessed outlet-side surface helps enable the spring to be connected to the valve head. For example, the spring may have a planar support surface, and the spring may contact the valve head at the planar support surface, such as at the outlet-side surface of the valve head.

In another aspect of the present disclosure, a pressure relief valve for a fluid pump comprises a housing assembly defining a cavity. The housing assembly also defines an inlet at a first end of the cavity, a valve seat at the inlet, and multiple outlets at a second end of the cavity opposite from the first end. At least some of the multiple outlets have unequal flow areas such that fluid pressure distribution across a flow area of the cavity is nonsymmetrical.

In one or more embodiments, the multiple outlets include three symmetrically-spaced outlets. A first of the multiple outlets (i.e., a first outlet) has a first flow area, a second of the multiple outlets (i.e., a second outlet) has a second flow area greater than the first flow area, and a third of the multiple outlets (i.e., a third outlet) has the second flow area. In such an embodiment, fluid pressure will be more restricted at the first outlet than at the second and the third outlets, creating a greater back pressure at the first outlet than at the second and third outlets and causing an uneven flow distribution through the cavity. This uneven flow distribution is utilized to minimize chatter. For example, a valve head that is a ball may be used to open and close the valve, and the housing wall forming the valve seat may be frustoconical. The greater pressure in the cavity from the inlet to the first outlet will cause the valve head to be pushed laterally (i.e., off-center) within the cavity while remaining in contact with the valve seat. Each of the multiple outlets may have a circular flow area, or a flow area of a different shape.

In one or more embodiments of the pressure relief valve with the outlets of unequal flow area, the pressure relief valve may include a spring disposed in the cavity, and a valve head having an inlet-side surface configured to seat against the valve seat to close the inlet. The spring may be biased to urge the valve head against the valve seat to a seated position, and may be configured to be compressed when fluid pressure at the inlet exceeds fluid pressure at the outlet by at least a predetermined amount such that the valve head is pushed away from the inlet to an unseated position in which the valve head is off-center within the cavity and remains in partial contact with the valve seat.

In one or more embodiments of the pressure relief valve, the housing assembly includes an intermediate housing defining the cavity, and a pump cover secured to the intermediate housing and defining the multiple outlets. An internal wall of the intermediate housing may have grooves extending lengthwise between the inlet and the multiple outlets, and at least some of the grooves may have unequal flow areas. For example, in one or more embodiments, a smallest one of the grooves has a smaller flow area than each other one of the grooves, a smallest one of the multiple outlets has a smaller flow area than each other one of the multiple outlets, and the smallest one of the grooves is disposed nearest to the smallest one of the multiple outlets. For example, the first outlet may be the smallest outlet, and the smallest groove may be radially aligned with the smallest outlet. In one or more embodiments, each of the grooves is a U-channel.

Within the scope of the present disclosure, an engine assembly for a vehicle comprises an engine cover defining a pump inlet and a valve seat at the pump inlet. The engine assembly also comprises an oil pump configured to pump oil through the engine assembly. The oil pump includes a pump housing secured to the engine cover. The pump housing defines a cavity. The oil pump also includes a pump cover defining an outlet of the cavity, and a pressure relief valve. The pressure relief valve includes a spring disposed in the cavity, and a valve head having an inlet-side surface configured to seat against the valve seat to close the inlet, and a recessed outlet-side surface confronting a support end of the spring such that the valve head extends past the support end of the spring toward the outlet. The spring is biased to urge the valve head against the valve seat to a seated position, and is configured to be compressed when fluid pressure at the inlet exceeds fluid pressure at the outlet by at least a predetermined amount such that the valve head is pushed away from the valve seat to an unseated position.

In one or more embodiments, the valve head has a generally uniform thickness between the inlet-side surface and the outlet-side surface, and a contact surface of the valve head with the valve seat is annular. A portion of the inlet-side surface exposed to fluid pressure at the inlet when the valve head is in the seated position may be flat. Alternatively, a portion of the inlet-side surface exposed to fluid pressure at the inlet when the valve head is in the seated position may have a recessed center. In still another embodiment, a portion of the inlet-side surface with a protruding center may be exposed to fluid pressure at the inlet when the valve head is in the seated position.

The above features and advantages and other features and advantages of the present disclosure are readily apparent from the following detailed description of the best modes for carrying out the disclosure when taken in connection with the accompanying drawings.

DETAILED DESCRIPTION

Figure 1:
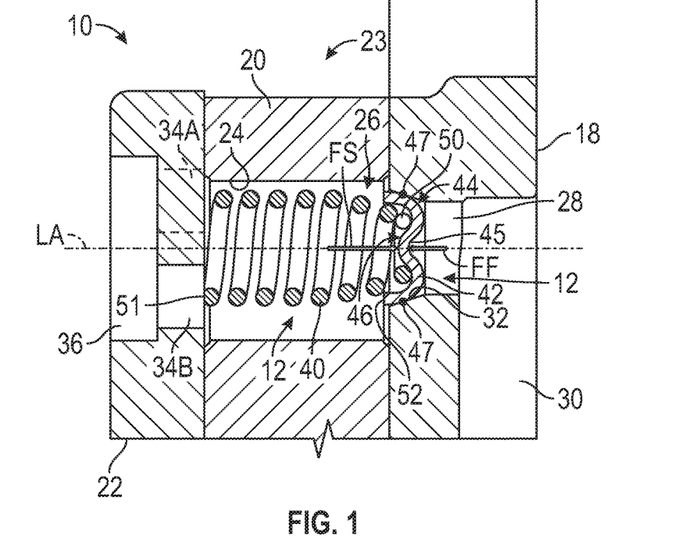
FIG. 1 is a fragmentary cross-sectional illustration of a fluid pump taken at lines 1-1 in FIG. 3, with an embodiment of a pressure relief valve in a seated position.
Figure 27:
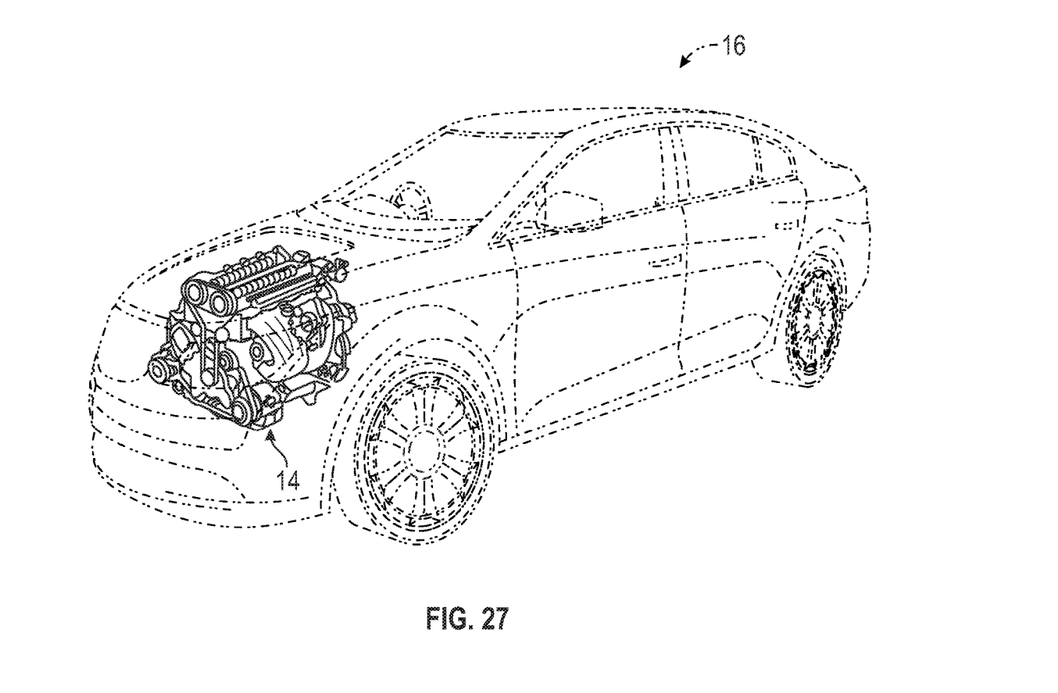
FIG. 27 is a schematic perspective illustration of a vehicle with an engine assembly having and showing a vehicle body in phantom.
Figure 28:
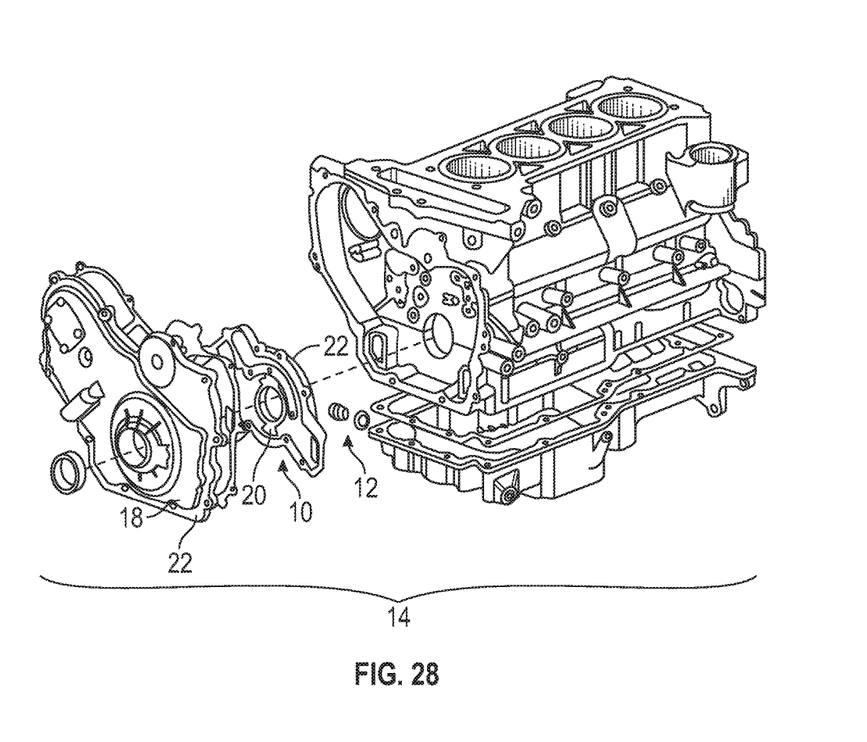
FIG. 28 is a schematic exploded view of the engine assembly of FIG. 27.

Referring to the drawings, wherein like reference numbers refer to like components throughout the views, FIG. 1 is a fragmentary cross-sectional illustration of a portion of a fluid pump 10 with a first embodiment of a pressure relief valve 12 in a seated position. The fluid pump 10 and pressure relief valve 12 may be used in applications in which fluid is circulated via a pump and in which it is beneficial to relieve pressure in the pump. For example, the fluid pump 10 may be used in both vehicle and non-vehicle applications. Potential vehicle applications include an engine oil pump or a transmission oil pump. In the embodiment shown, the fluid pump 10 is an engine oil pump, and is included in an engine assembly 14 of a vehicle 16 (see FIGS. 27-28) for circulating oil throughout the engine assembly 14. The engine assembly 14 is shown installed on a vehicle 16 represented in phantom in FIG. 27.

With reference to FIG. 1, an engine front cover 18 is a portion of the engine assembly 14 that forms the pump 10. The pump 10 also includes a pump housing 20, which may be referred to herein as an intermediate housing, and which is secured to the engine front cover 18. The pump 10 also includes a pump cover 22 that is secured to the intermediate housing 20. The front cover 18, pump housing 20, and pump cover 22 together comprise a housing assembly 23 of the pressure relief valve 12.

Figure 3:
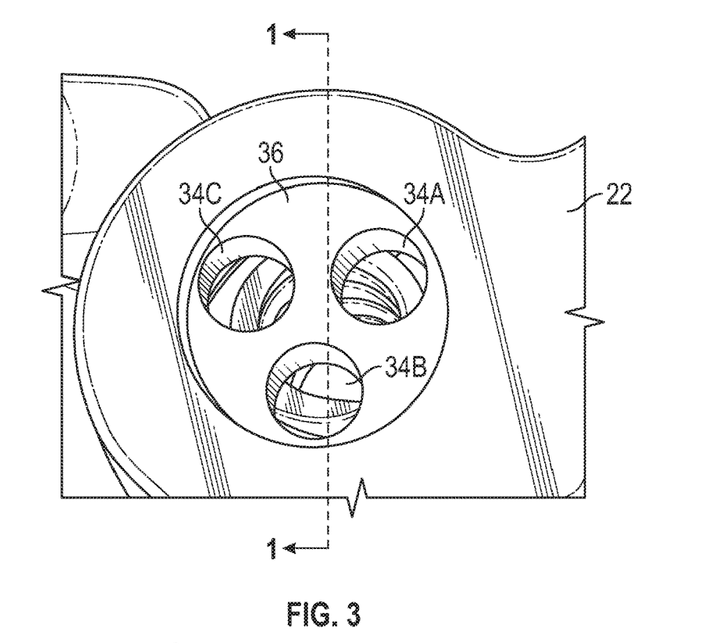
FIG. 3 is a fragmentary end view illustration of the fluid pump of FIG. 1 showing a pump cover with multiple outlets.

The pump housing 20 has an internal wall 24 that defines a cavity 26. The front cover 18 defines an inlet 28 that is in fluid communication to the pressure relief valve 12, and provides fluid to the cavity 26 from a pump chamber 30. The front cover 18 also defines a valve seat 32 at the inlet 28. In the embodiment shown, the valve seat 32 is frustoconical, although a valve seat with a different surface profile may be used. The pump cover 22 defines three symmetrically-spaced outlets 34A, 34B, 34C that are in fluid communication with the pump cavity 26. The three outlets 34A, 34B, 34C are best shown in FIG. 3 and may be referred to together herein as the outlet 34A, 34B, 34C. The three outlets 34A, 34B, 34C empty into a common return chamber 36 and enable fluid that is released from the pump 10 when the pressure relief valve 12 unseats to be returned to circulating flow within the oil system of the engine assembly 14.

Figure 4:
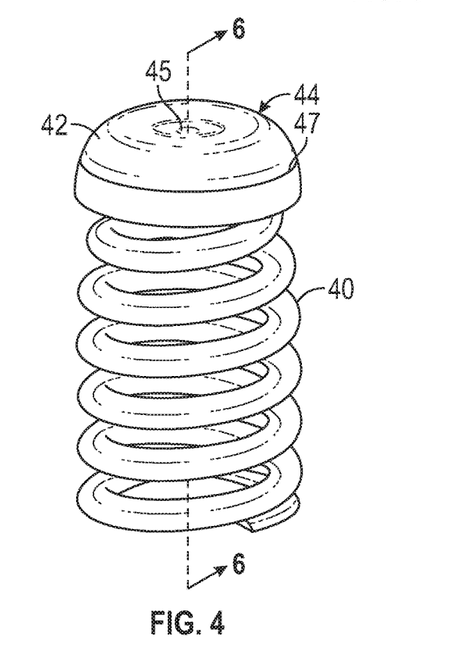
FIG. 4 is a schematic perspective illustration of a valve head and spring of the pressure relief valve of FIG. 1.

Referring to FIG. 1, the relief valve 12 includes a spring 40 disposed in the cavity 26, and a valve head 42 that may be integrally connected to the spring 40 as discussed herein. The valve head 42 has an inlet-side surface 44 that is configured to seat against the valve seat 32 to close the inlet 28, thereby preventing fluid transmission from the pump chamber 30 to flow through the inlet 28 to the cavity 26. The inlet-side surface 44 is exposed to fluid pressure at the inlet 28 when the valve head 42 is in the seated position. As best shown in FIG. 4, the inlet-side surface 44 has a recessed center 45. The valve head 42 contacts the valve seat 32 when in the seated position at a circle 47 that extends around the valve seat 32. The contact circle 47 is indicated at two points in FIG. 1 and is partially shown in FIGS. 4 and 6. The contact surface of the valve head 42 with the valve seat 32 is thus annular.

Figure 6:
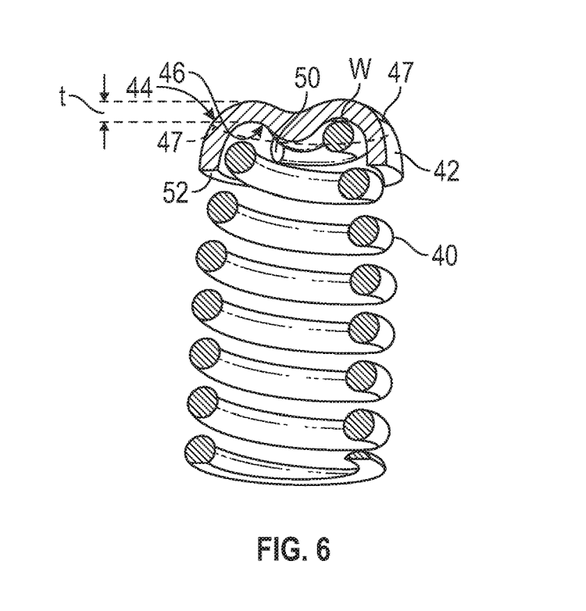
FIG. 6 is a schematic perspective cross-sectional illustration of the valve head and spring of FIG. 4 taken at lines 6-6 in FIG. 4.

The valve head 42 also has a recessed outlet-side surface 46 that confronts a support end 50 of the spring 40. The recessed outlet-side surface 46 is generally annular. The valve head 42 is of a generally uniform thickness t between the inlet-side surface 44 and the outlet-side surface 46, as best shown in FIG. 6. In fact, the valve head 42 may be stamped from a metal sheet. This method of manufacturing may be generally less expensive than the process for manufacturing a solid steel ball valve of a ball valve of another material. A sheet may absorb energy when the valve head 42 is seated by elastic deformation more readily than a thicker valve head, such as a spherical ball head, which may increase valve life.

Figure 2:
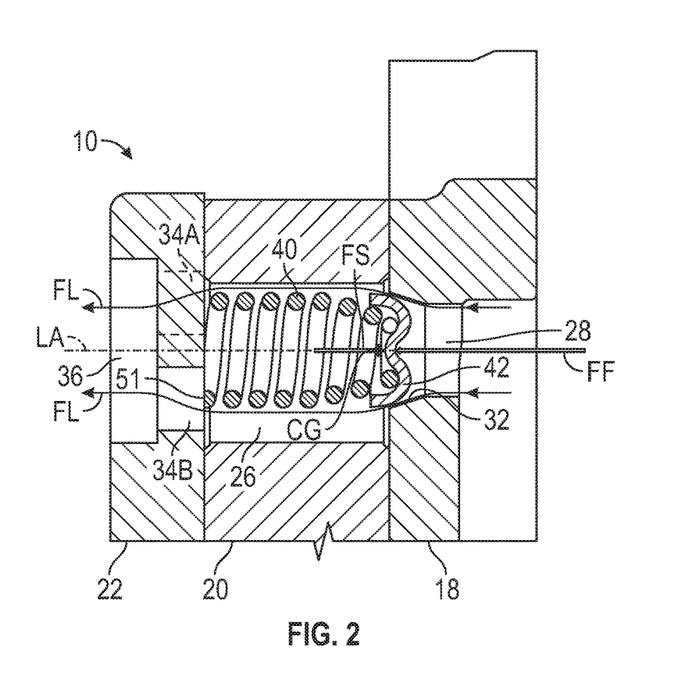
FIG. 2 is a fragmentary cross-sectional illustration of the fluid pump of FIG. 1, with the pressure relief valve in an unseated position.

With the recessed outlet-side surface 46, the support end 50 of the spring 40 is generally nested in and surrounded by the valve head 42 at the outlet side of the valve head 42 as best shown in FIG. 6. The valve head 42 thus extends past the support end 50 of the spring 40 toward the outlets 34A, 34B, 34C. As shown in FIGS. 1 and 6, the valve head has a continuous terminal edge 52 (also referred to as a rim) that extends further toward the outlets 34A, 34B, 34C than the support end 50 of the spring 40. With this configuration, as indicated in FIG. 2, a center of gravity CG of the valve head 42 is behind a force FS applied by the spring 40 to the valve head 42. The force FS of the spring 40 is applied at the support end 50, and most specifically at a contact line CL (i.e., the line at which the support end 50 of the spring 40 contacts the valve head 42, shown in FIG. 5). Stated differently, the center of gravity CG of the valve head 42 is closer to the outlets 34A, 34B, 34C than is the contact line CL of the spring 40. The spring 40 thus pulls the valve head 42 against the valve seat 32 to the seated position. This lends stability to the valve head 42 in the seated position as the valve head 42 is better able to center itself in the inlet 28 against the valve seat 32, as compared to a valve head that is pushed against a valve seat, such as in the case of a spherical ball valve head which has a center of gravity entirely forward of the pushing force of the spring. The spring 40 may be spot welded or otherwise integrally connected to the valve head 42 along the contact line CL, as represented by weld W in FIG. 6. The relatively thin thickness t of the valve head 42 enables spot welding. By integrally connecting the valve head 42 to the spring 40, the spring and valve head 42 are integrated as a unitary component, simplifying assembly and reducing assembly time.

Figure 5:
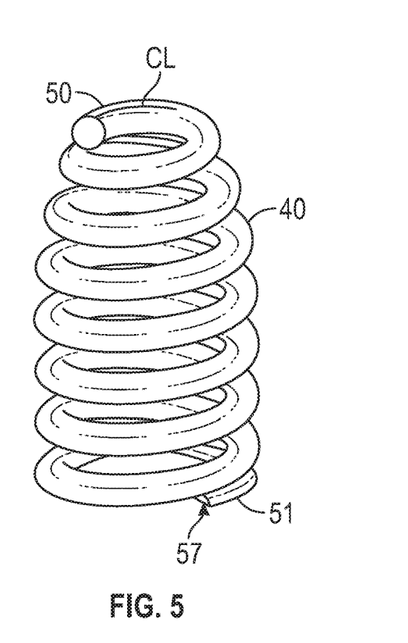
FIG. 5 is a schematic perspective illustration of the spring of FIG. 4.
Figure 8:
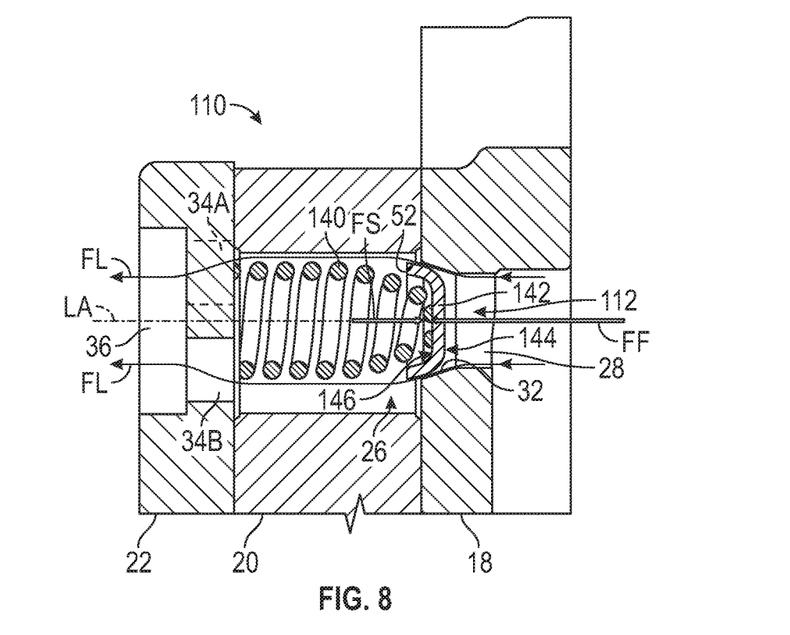
FIG. 8 is a fragmentary cross-sectional illustration of the fluid pump of FIG. 7, with the pressure relief valve in an unseated position.
Figure 9:
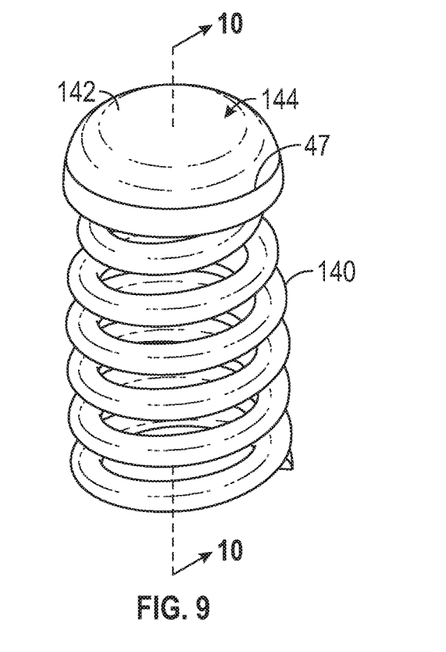
FIG. 9 is a schematic perspective illustration of a valve head and spring of the pressure relief valve of FIG. 7.

The spring 40 is biased to urge the valve head 42 against the valve seat 32 to the seated position of FIG. 1. A distal end 51 of the spring 40 is supported on the pump cover 22 as shown in FIGS. 1 and 2, such that the spring 40 is compressed toward and against the pump cover 22. The spring 40 is shown in isolation in FIG. 5. The pump cover 22 may have a groove at the surface facing the inlet 28 that is configured to receive the distal end 51 of the spring 40. The distal end 51 of the spring 40 has a flat terminal surface 57, as indicated in FIG. 5. The spring 40 is configured to be compressed when fluid pressure at the inlet 28 acting on the inlet-side surface 44 exceeds fluid pressure at the outlet 34A, 34B, 34C acting on the outlet-side surface 46 by at least a predetermined amount such that the valve head 42 is pushed away from the valve seat 32 to an unseated position shown in FIG. 2. Stated differently, the stiffness of the spring 40 is selected so that the spring force FS applied by the spring 40 is overcome when the net force FF of the fluid pressure acting on the valve head 42 exceeds the spring force FS. When the force on the inlet-side surface (i.e., fluid pressure acting on the inlet-side surface 44 multiplied by the exposed surface area of the inlet-side surface 44) is greater than the spring force FS, the valve 12 opens. Fluid flow is shown by representative flow lines FL in FIG. 2, and is symmetrical through the cavity 26 from the inlet 28 to the outlets 34A, 34B, 34C with evenly distributed fluid pressure. Flow lines through outlets 34A and 34B are represented in FIG. 8. Although not shown, flow representable by a similar flow line extends from the inlet 28 through the outlet 34C. The exposed surface area at the inlet-side surface 44 when the valve head 42 is in the seated position is the area bounded by the contact circle 47. However, when the valve head 42 is in the unseated position of FIG. 2, the entire inlet-side surface 44 above the rim 52 is exposed to the fluid pressure at the inlet 28. Stated differently, the portion between the contact circle 47 and the rim 52 is now also exposed to inlet fluid pressure. The pressure relief valve 12 also has a desirable amount of blowdown, as it quickly reseats once pressure is relieved, such as due to the ability of the valve head 42 to center itself, as discussed herein.

Figure 7:
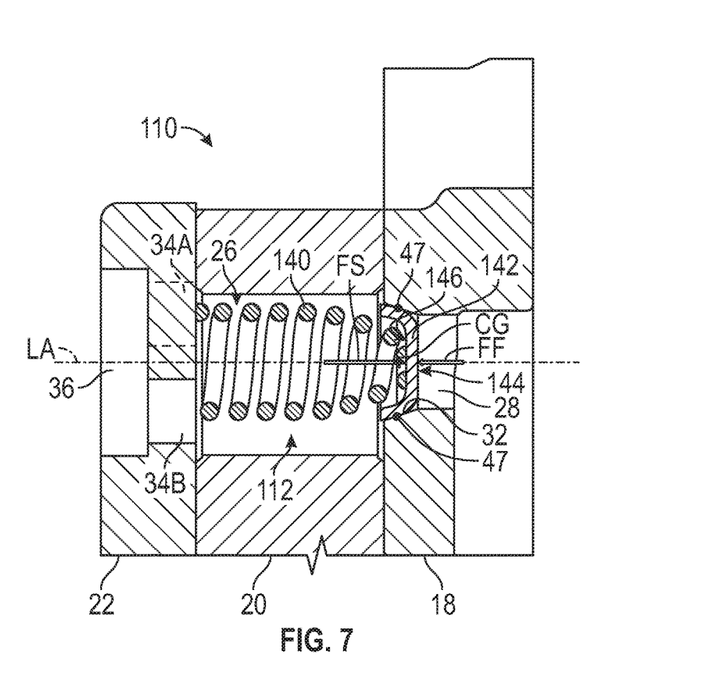
FIG. 7 is a fragmentary cross-sectional illustration of the fluid pump of FIG. 1 with an alternative embodiment of a pressure relief valve in a seated position.

FIGS. 7-8 show a fluid pump 110 with another embodiment of a relief valve 112. The pump 110 and relief valve 112 are alike in many aspects to pump 10 and relief valve 12. Like components are referred to with like reference numbers in FIGS. 7 and 8 and their configuration and function is the same as described with respect to FIGS. 1 and 2. The relief valve 112 is different than relief valve 42 in that the valve head 42 is replaced with a valve head 142. Valve head 142 has a generally flat inlet-side surface 144, with the portion above the contact circle 47 exposed to fluid pressure at the inlet 28 when the valve head 142 is in the seated position of FIG. 7. When the valve head 142 is in the unseated position of FIG. 8, the entire inlet-side surface 144 above the rim 52 is exposed to the fluid pressure at the inlet 28. In comparison to the valve head 42, there is less surface area exposed to fluid pressure at the inlet 28.

Figure 10:
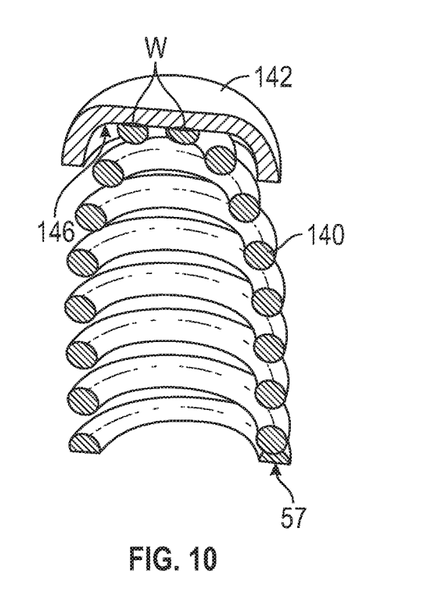
FIG. 10 is a schematic perspective cross-sectional illustration of the valve head and spring of FIG. 9 taken at lines 10-10 in FIG. 9.
Figure 11:
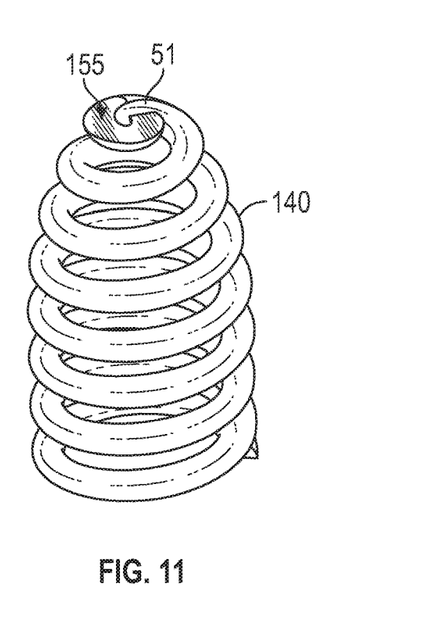
FIG. 11 is a schematic perspective illustration of the spring of FIG. 9.

The valve head 142 has a recessed outlet-side surface 146. Similar to valve head 42, the center of gravity CG of valve head 142 is behind the spring force FS applied by the spring 140. As shown in FIG. 11, because of the relatively flat outlet-side surface 146 of the head valve 142, the support end 50 of the spring 140 may be ground flat to have a planar support surface 155 at which the spring 140 contacts the valve head 142. The planar support surface 155 provides a wider support area than a contact line CL of the rounded end 50 of spring 40. The spring 140 may be spot welded or otherwise integrally connected to the head valve 142 at the planar support surface 155 as represented by spot weld W in FIG. 10.

Figure 12:
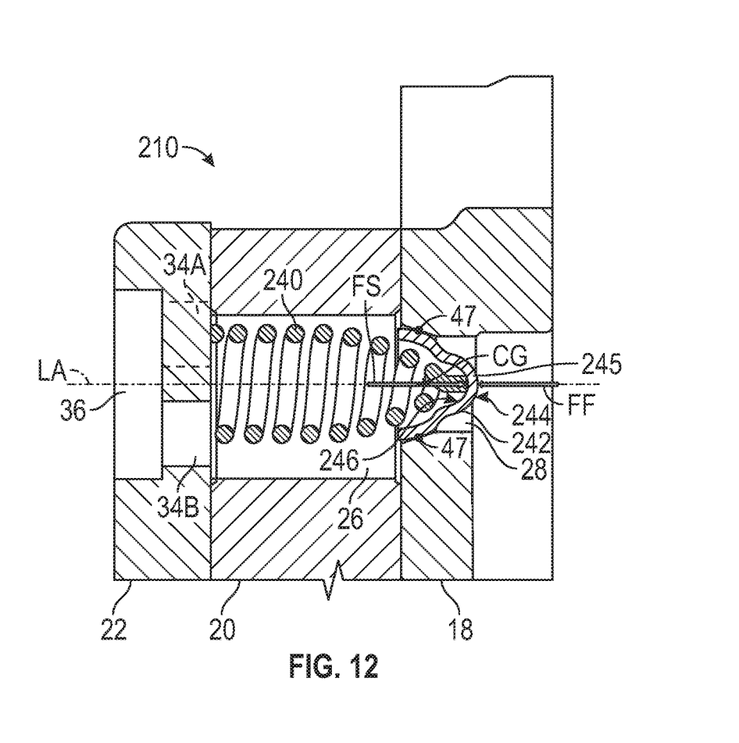
FIG. 12 is a fragmentary cross-sectional illustration of the fluid pump of FIG. 1 with an alternative embodiment of a pressure relief valve in a seated position.
Figure 13:
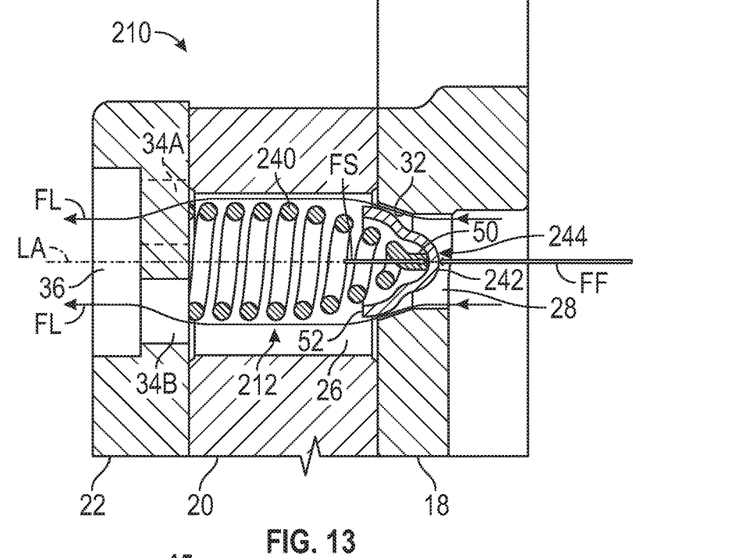
FIG. 13 is a fragmentary cross-sectional illustration of the fluid pump of FIG. 12, with the pressure relief valve in an unseated position.
Figure 14:
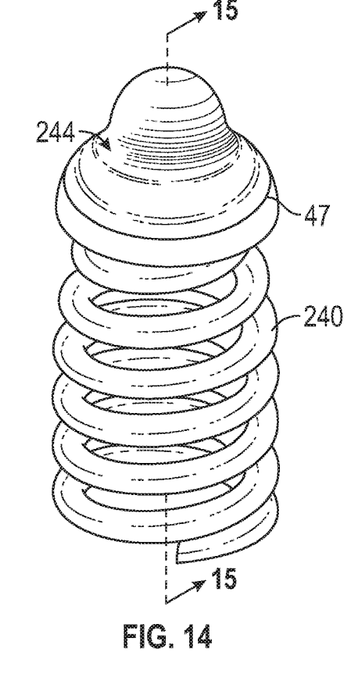
FIG. 14 is a schematic perspective illustration of the valve head and spring of FIG. 12.

FIGS. 12-13 show a fluid pump 210 with another embodiment of a relief valve 212. The pump 210 and relief valve 212 are alike in many aspects to pump 10 and relief valve 12 and to pump 110 and relief valve 112. Like components are referred to with like reference numbers in FIGS. 12 and 13 and their configuration and function is the same as described with respect to FIGS. 1 and 2. The relief valve 212 is different than relief valve 42 in that the valve head 42 is replaced with a valve head 242. Valve head 242 has an inlet-side surface 244 with a protruding center 245 which is above the contact circle 47 and is exposed to fluid pressure at the inlet 28 when the valve head 242 is in the seated position of FIG. 12. With the protruding center 245, the valve head 242 may generally be described as bell shaped. When the valve head 242 is in the unseated position of FIG. 13, the entire inlet-side surface 244 above the rim 52 is exposed to the fluid pressure at the inlet 28. In comparison to the valve head 42 and the valve head 142, there is more surface area exposed to fluid pressure at the inlet 28 both in the seated and unseated positions of the valve head 242.

The valve head 242 has a recessed outlet-side surface 246. Similar to valve head 42, the center of gravity CG of valve head 242 is behind the spring force FS applied by the spring 240. As shown in FIG. 11, because of the protruding center at the inlet-side surface 244, the outlet-side surface 246 forms a more elongated cavity in which the spring 240 is nested. This places the center of gravity CG of the valve head 242 even further behind the spring force FS than in the embodiments of FIGS. 1-2 and 7-8, lending even more stability to the valve head 242.

Figure 15:
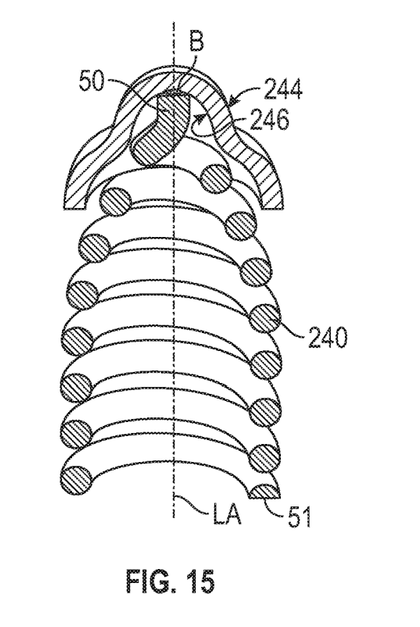
FIG. 15 is a schematic perspective cross-sectional illustration of the valve head and spring of FIG. 14 taken at lines 15-15 in FIG. 14.
Figure 16:
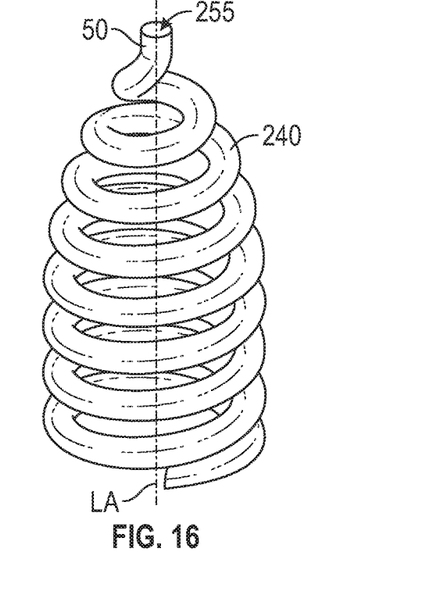
FIG. 16 is a schematic perspective illustration of the spring of FIG. 14.
Figure 17:
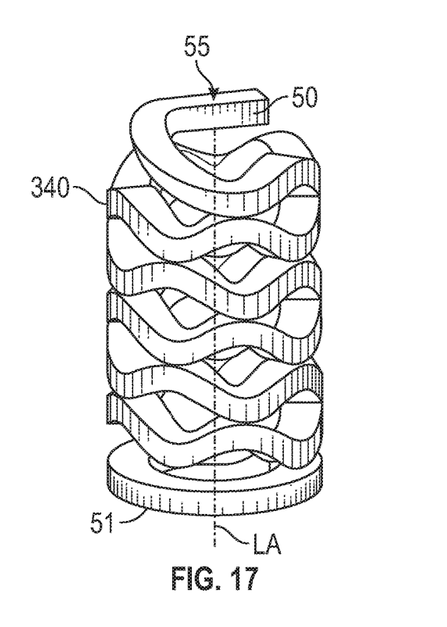
FIG. 17 is a schematic perspective illustration of an alternative embodiment of a spring for use with the valve head of FIG. 8.
Figure 18:
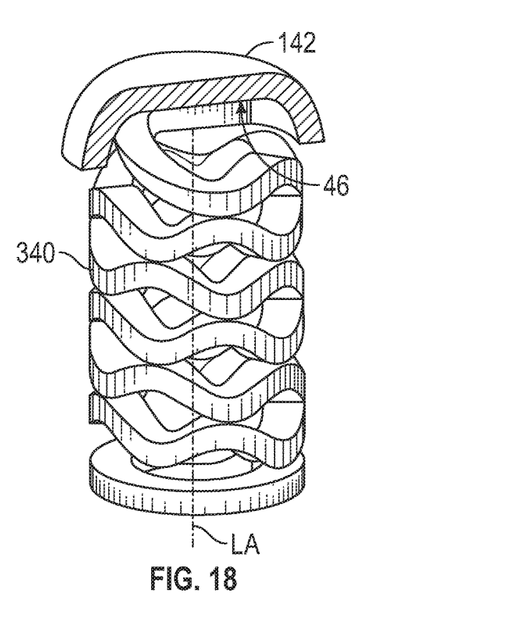
FIG. 18 is a schematic perspective illustration of the spring of FIG. 17 and the valve head of FIG. 8 in cross-sectional view.
Figure 19:
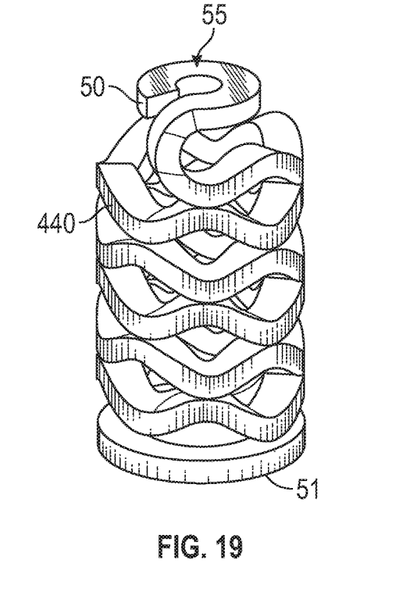
FIG. 19 is a schematic perspective illustration of an alternative embodiment of a spring for use with the valve head of FIG. 8.
Figure 20:
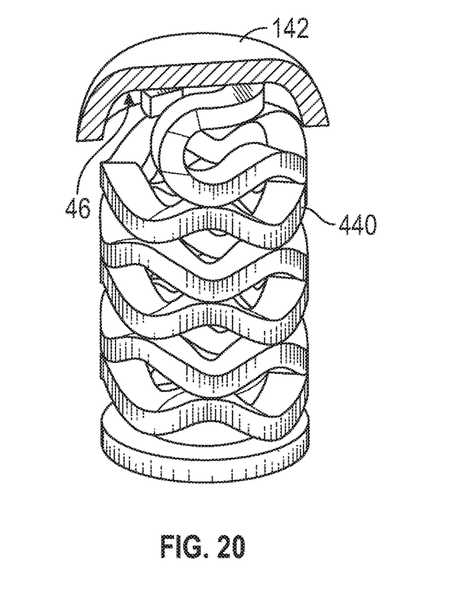
FIG. 20 is a schematic perspective illustration of the spring of FIG. 19 and the valve head of FIG. 8 in cross-sectional view.

As best shown in FIG. 15, the spring 240 has a protruding support end 50 extending along a longitudinal axis LA of the spring 240 and into contact with the outlet-side surface 246 of the head valve 242. The support end 50 of the spring 140 is a terminal end that has flat, planar support surface 255 (shown in FIG. 16), and may be integrally connected by brazing or otherwise to the head valve 242 at the outlet-side surface 246, as represented by brazed joint B in FIG. 15.

Although springs 40, 140, and 240 are represented as coil springs, other types of springs may be used within the scope of the present disclosure. For example, FIGS. 17-20 show different embodiments of wave springs 340, 440 that may be used particularly with valve head 142 to provide a pressure relief valve within the scope of the present teachings. The wave springs 340, 440 generally provide the same spring force as a regular coil spring (such as coil spring 40) in approximately one half the spring height. Thus, the use of wave springs could enable a shorter cavity 26, or could provide greater spring force SF if of the same height as coil spring 40. The coil of the wave springs 340 and 440 is generally square or rectangular in cross-section as opposed to the coil of springs 40, 140, 240, which is generally round in cross-section. The generally square or rectangular wave springs 340, 440 provide a larger flat contact surface at the distal end 51, and a large flat support surface 55 at the support end 50. Both of these attributes contribute to stability of the springs 340, 440, in that the spring 340 or 440 is less likely to load and compress in a non-symmetric manner about the longitudinal axis LA of the spring. The wave springs 340 or 440 may be spot welded to the valve head 142 at the contact surface 55 similarly as described with respect to wave spring 140.

Figure 21:
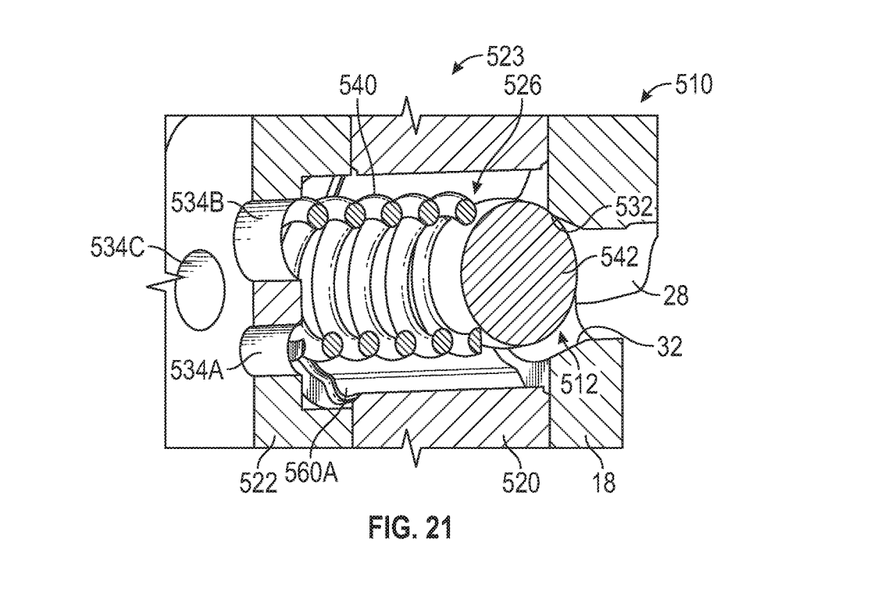
FIG. 21 is a fragmentary perspective cross-sectional illustration of an alternative embodiment of a fluid pump with an alternative embodiment of a pressure relief valve in an unseated position.
Figure 22:
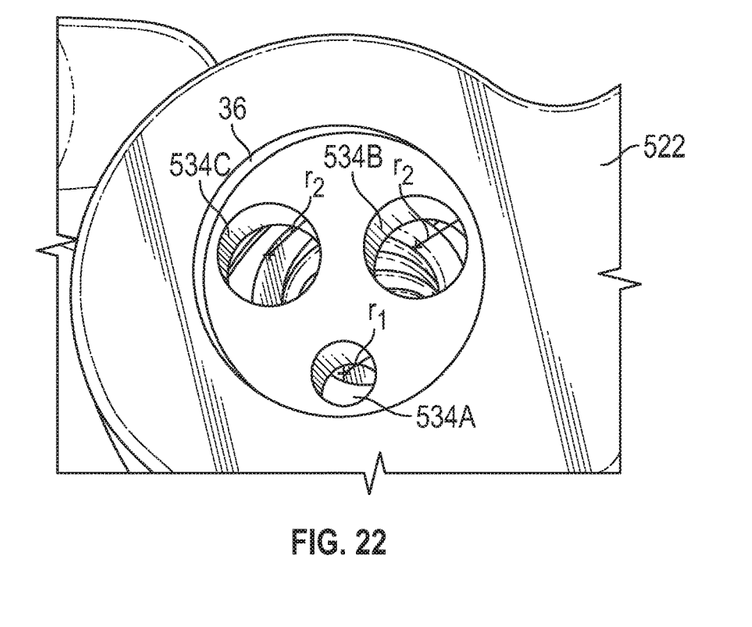
FIG. 22 is a fragmentary perspective illustration of a pump cover of the fluid pump of FIG. 21.

FIG. 21 shows another embodiment of a fluid pump 510 that may be used in vehicle and non-vehicle applications. For example, the fluid pump 510 may be used in the engine assembly 14 of FIGS. 27-28 of the vehicle 16 of FIG. 28 as an alternative to fluid pump 10, 110, or 210. A pressure relief valve 512 for the fluid pump 510 includes a housing assembly 523. The housing assembly 523 includes the engine front cover 18, a pump housing 520, also referred to as an intermediate housing, and a pump cover 522.

Figure 23:
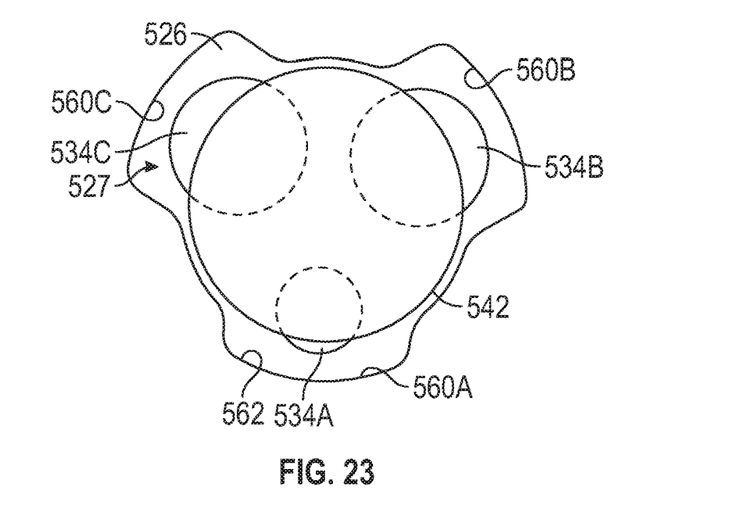
FIG. 23 is a schematic end view illustration of the fluid cavity, fluid outlets, and valve head of FIG. 21.

The housing assembly 523 defines a cavity 526 that has a flow area 527, best shown in FIG. 23. The flow area 527 is the area perpendicular to the longitudinal axis LA of the cavity 26 through which fluid flows from the inlet 28 to the outlets 534A-534C. The flow area 527 is the combined area of the generally circular bore of the cavity 526 and the area of three grooves 560A, 560B, 560C shaped like U-channels that are formed in the internal wall 562 of the pump housing 520 and are positioned as lobes of the cavity 26, as further explained herein.

Figure 25:
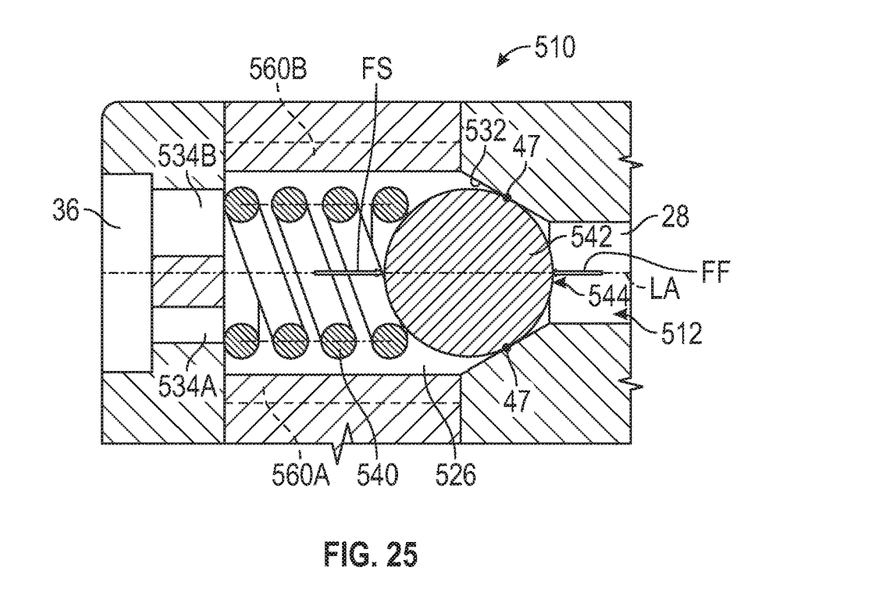
FIG. 25 is a schematic cross-sectional illustration of the fluid pump of FIG. 21 with the pressure relief valve in a seated position.

The housing assembly 523 also defines an inlet 28 at a first end of the cavity 526, a valve seat 32 at the inlet, and multiple outlets 534A, 534B, 534C at a second end of the cavity 526 opposite from the first end. The multiple outlets 534A, 534B, 534C feed into a main outlet 36 (best shown in FIGS. 25 and 26). At least some of the outlets 534A, 534B, 534C have unequal flow areas such that fluid pressure distribution across the flow area 527 is nonsymmetrical. More specifically, the multiple outlets 534A, 534B, 534C are three symmetrically-spaced outlets. A first of the multiple outlets (i.e., a first outlet 534A) has a first flow area A1, a second of the multiple outlets (i.e., a second outlet 534B) has a second flow area A2 greater than the first flow area, and a third of the multiple outlets (i.e., a third outlet 534C) has the second flow area A2. In the embodiment shown, each of the multiple outlets 534A, 534B, 534C is circular. Accordingly, the flow area (FA) of each outlet is equal to the area of a circle:

$$FA = \pi r^2, \text{ where } r \text{ is the radius of the circle.}$$

The first outlet 534A has a radius $r_1$ and the second and third outlets each have a radius $r_2$ that is greater radius $r_1$. In such an embodiment, fluid pressure will be more restricted at the first outlet 534A than at either of the second and the third outlets 534B, 534C, such that the flow rate through the first outlet 534A is less than either of the flow rates through the second and the third outlets 534B, 534C, creating a greater back pressure at the first outlet 534A than at the second and third outlets, and causing an uneven flow distribution through the cavity 526. This uneven flow distribution may be utilized to minimize chatter.

Figure 24:
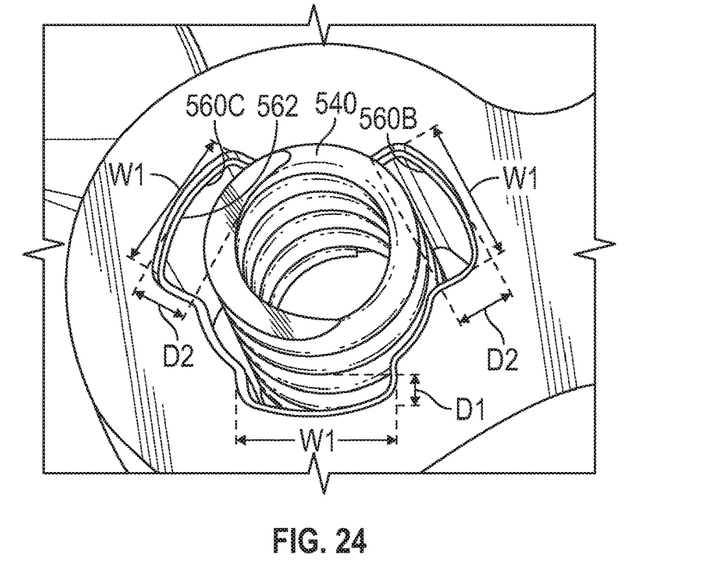
FIG. 24 is a fragmentary perspective illustration of the fluid pump of FIG. 21 with the pump cover of FIG. 22 removed.

Additionally, the grooves 560A, 560B, 560C of the internal wall 562 of the intermediate housing extend lengthwise between the inlet 28 and the multiple outlets 534A, 534B, 534C. Like the outlets 534A, 534B, 534C, some of the grooves 560A, 560B, 560C also have unequal flow areas. For example, the smallest one of the grooves 560A has a smaller flow area than each other one of the grooves 560B, 560C, and is disposed nearest to the smallest, first outlet 534A. As shown in FIG. 24, each of the grooves 560A, 560B, 560C is of the same width W1. The groove 560A is of a depth D1 and each of grooves 560B and 560C is of depth D2. Depth D1 is less than a depth D2. The cross-sectional flow area of the groove 560A is thus less than the cross-sectional flow area of groove 560B, and less then the cross sectional flow area of groove 560C. The smallest groove 560A may be radially aligned with the smallest outlet 534A, as shown in FIG. 23. In one or more embodiments, each of the grooves is a U-channel, but the grooves may have other shapes. Additionally, each of the grooves 560A, 560B, and 560C could have a different flow area than each other one of the grooves 560A, 560B, 560C instead of the grooves 560B and 560C having the same flow area. In either case, the grooves 560A, 560B, 560C have an unequal flow area, resulting in unequal flow rates and contributing to the asymmetrical distribution of pressure in the cavity 526.

Figure 26:
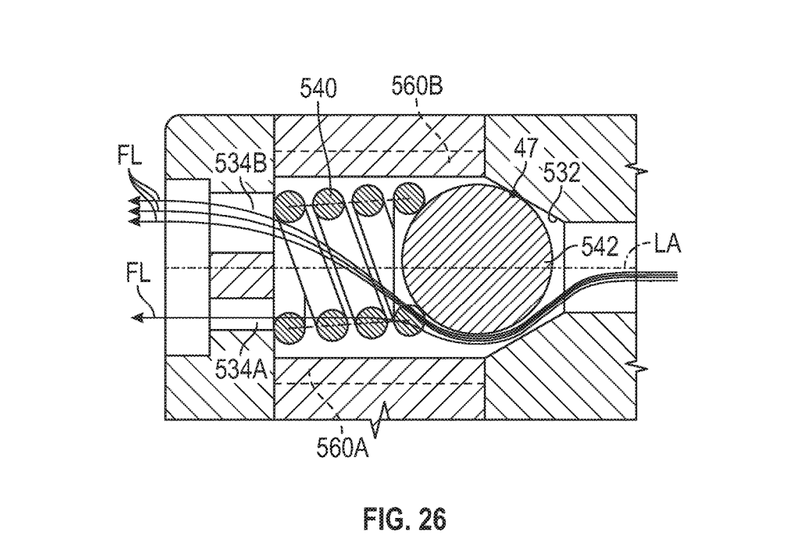
FIG. 26 is a schematic cross-sectional illustration of the fluid pump of FIG. 21 with the pressure relief valve in an unseated position.

The pump 510 may include a pressure relief valve 512 that has a valve head 542 that is spherical (i.e., the valve head 542 is a ball). The pressure relief valve 512 includes a spring 540 disposed in the cavity 526. The spring 540 is biased to urge the valve head 542 against the valve seat 532 to the seated position shown in FIG. 25. In the seated position, an inlet-side surface 544 of the valve head 542 is configured to seat against the valve seat 532 to close the inlet 28. The spring 540 is configured to be compressed when fluid pressure at the inlet 28 exceeds fluid pressure at the outlet 36 by at least a predetermined amount such that the valve head 542 is pushed away from the valve seat 32 to an unseated position shown in FIG. 26. When fluid pressure begins to unseat the valve head 542, greater back pressure in the cavity 526 extends longitudinally in the cavity 526 in line with the smallest flow outlet 534A (and with the smallest groove 560A) and causes uneven flow distribution. The valve head 542 will therefore move laterally, off-center within the cavity 526 away from the inlet 28, and remain in partial contact with the valve seat 32 (at one side of the valve seat 32) in the unseated position. In other words, the valve head 542 will roll against the frustoconical surface of the valve seat 532 from the seated position to the unseated position of FIGS. 21 and 25, and then roll against the surface of the valve seat 534 from the unseated position to the seated position when the pressure relief valve 512 closes. The spring 540 is also tilted relative to the longitudinal axis LA of the pressure relief valve 512 when the valve head 542 is unseated, as shown in FIG. 26.

The back pressure due to the asymmetrical flow distribution will keep the valve head 542 against one side of the valve seat 532, rather than moving completely away from the valve seat 532, as would happen if the flow distribution and fluid pressures in the cavity 526 were even distributed over the flow area 527. The uneven flow distribution is represented in FIG. 26 by showing more flow lines FL exiting outlet 534B than exiting the smaller outlet 534A. By keeping the valve head 542 at least partially against the valve seat 532 at all times, chatter that may occur if the valve head 542 completely separates from the valve seat 532 upon opening and then re-contacts the valve seat 532 upon closing is avoided. The valve head 532 may also oscillate less than would a pressure relief valve that has a spherical valve head but with symmetrical flow and fluid pressure. For example, if the relief flow is symmetrical and a spherical valve head is used, the valve head lifts entirely away from the valve seat in the cavity and is essentially "free floating" within the cavity against the spring, is predisposed to variations in oil flow, and the natural frequency of the spring-mass combination could lead to increased oscillation and chatter. With the configuration of the oil pump 510, however, forceful contact of the valve head 542 with the valve seat 534 is lessened, and valve life may be increased due to lessened wear.

While the best modes for carrying out the disclosure have been described in detail, those familiar with the art to which this disclosure relates will recognize various alternative designs and embodiments for practicing the disclosure within the scope of the appended claims.

What is claimed is:

1. A pressure relief valve for a fluid pump, the pressure relief valve comprising:
a housing assembly defining a cavity, an inlet at a first end of the cavity, a valve seat at the inlet, and multiple outlets at a second end of the cavity opposite from the first end; and wherein at least some of the multiple outlets have unequal flow areas such that fluid pressure distribution across a flow area of the cavity is nonsymmetrical;
wherein:
the housing assembly includes an intermediate housing defining the cavity, and a pump cover secured to the intermediate housing and defining the multiple outlets;
an internal wall of the intermediate housing has grooves extending lengthwise between the inlet and the multiple outlets; and
at least some of the grooves have unequal flow areas.

2. The pressure relief valve of claim 1, further comprising:
a spring disposed in the cavity;
a valve head having an inlet-side surface configured to seat against the valve seat to close the inlet; and
wherein the spring is biased to urge the valve head against the valve seat to a seated position, and is configured to be compressed when fluid pressure at the inlet exceeds fluid pressure at the outlet by at least a predetermined amount such that the valve head is pushed away from the inlet to an unseated position in which the valve head is off-center within the cavity and remains in partial contact with the valve seat.

3. The pressure relief valve of claim 1, wherein:
the multiple outlets include three symmetrically-spaced outlets;
a first of the multiple outlets has a first flow area;
a second of the multiple outlets has a second flow area greater than the first flow area; and
a third of the multiple outlets has the second flow area.

4. The pressure relief valve of claim 1, wherein:
a smallest one of the grooves has a smaller flow area than each other one of the grooves;
a smallest one of the multiple outlets has a smaller flow area than each other one of the multiple outlets; and
the smallest one of the grooves is disposed nearest to the smallest one of the multiple outlets.

5. The pressure relief valve of claim 4, wherein each of the grooves is a U-channel.

6. The pressure relief valve of claim 4, wherein each of the multiple outlets has a circular flow area.

7. An engine assembly for a vehicle comprising:
an engine cover defining a pump inlet and a valve seat at the pump inlet;
an oil pump configured to pump oil through the engine assembly and including:
a pump housing secured to the engine cover; wherein the pump housing defines a cavity;
a pump cover defining an outlet; and
a pressure relief valve comprising:
a spring disposed in the cavity; and
a valve head having an inlet-side surface configured to seat against the valve seat to close the inlet, and having a recessed outlet-side surface confronting a support end of the spring such that the valve head extends past the support end of the spring toward the outlet;
wherein the spring is biased to urge the valve head against the valve seat to a seated position, and is configured to be compressed when fluid pressure at the inlet exceeds fluid pressure at the outlet by at least a predetermined amount such that the valve head is pushed away from the valve seat to an unseated position.

8. The engine assembly of claim 7, wherein:
the valve head has a generally uniform thickness between the inlet-side surface and the outlet-side surface; and
a contact surface of the valve head with the valve seat is annular.

9. The engine assembly of claim 8, wherein a portion of the inlet-side surface exposed to fluid pressure at the inlet when the valve head is in the seated position is flat.

10. The engine assembly of claim 8, wherein a portion of the inlet-side surface exposed to fluid pressure at the inlet when the valve head is in the seated position has a recessed center.

11. The engine assembly of claim 8, wherein a portion of the inlet-side surface with a protruding center is exposed to fluid pressure at the inlet when the valve head is in the seated position.

* * * * *